US008438321B2

(12) United States Patent
Elzur et al.

(10) Patent No.: US 8,438,321 B2
(45) Date of Patent: *May 7, 2013

(54) METHOD AND SYSTEM FOR SUPPORTING HARDWARE ACCELERATION FOR ISCSI READ AND WRITE OPERATIONS AND ISCSI CHIMNEY

(75) Inventors: Uri Elzur, Irvine, CA (US); Kan Frankie Fan, Diamond Bar, CA (US); Scott Sterling McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,285

(22) Filed: Apr. 5, 2011

(65) Prior Publication Data

US 2011/0185089 A1 Jul. 28, 2011

Related U.S. Application Data

(63) Continuation of application No. 11/155,966, filed on Jun. 17, 2005, now Pat. No. 7,921,240.

(60) Provisional application No. 60/580,977, filed on Jun. 17, 2004, provisional application No. 60/660,652, filed on Mar. 11, 2005.

(51) Int. Cl.
*G06F 15/173* (2006.01)
*G06F 15/16* (2006.01)
*G06F 3/00* (2006.01)

(52) U.S. Cl.
USPC ............................ 710/52; 709/226; 709/250

(58) Field of Classification Search .................. None
See application file for complete search history.

(56) References Cited

U.S. PATENT DOCUMENTS

| 7,299,266 | B2 * | 11/2007 | Boyd et al. | 709/213 |
|---|---|---|---|---|
| 7,389,462 | B1 * | 6/2008 | Wang et al. | 714/748 |
| 7,487,264 | B2 * | 2/2009 | Pandya | 709/250 |
| 7,769,905 | B1 * | 8/2010 | Chu et al. | 709/250 |

* cited by examiner

*Primary Examiner* — Chun-Kuan Lee
*Assistant Examiner* — Richard B Franklin
(74) *Attorney, Agent, or Firm* — Thomas|Horstemeyer, LLP (57) ABSTRACT

Certain aspects of a method and system for supporting hardware acceleration for iSCSI read and write operations via a TCP offload engine may comprise pre-registering at least one buffer with hardware. An iSCSI command may be received from an initiator. An initiator test tag value, a data sequence value and/or a buffer offset value of an iSCSI buffer may be compared with the pre-registered buffer. Data may be fetched from the pre-registered buffer based on comparing the initiator test tag value, the data sequence value and/or the buffer offset value of the iSCSI buffer with the pre-registered buffer. The fetched data may be zero copied from the pre-registered buffer to the initiator.

21 Claims, 7 Drawing Sheets

METHOD AND SYSTEM FOR SUPPORTING HARDWARE ACCELERATION FOR ISCSI READ AND WRITE OPERATIONS AND ISCSI CHIMNEY

CROSS-REFERENCE TO RELATED APPLICATIONS/INCORPORATION BY REFERENCE

This application is a continuation of U.S. patent application Ser. No. 11/155,966 filed on Jun. 17, 2005, which application makes reference to, claims priority to, and claims the benefit of U.S. Provisional Patent Application Ser. No. 60/580,977 filed Jun. 17, 2004 and U.S. Provisional Patent Application Ser. No. 60/660,652 filed Mar. 11, 2005.

The following application makes reference to:
U.S. patent application Ser. No. 11/156,289 filed Jun. 17, 2005;
U.S. patent application Ser. No. 11/156,206 filed Jun. 17, 2005;
U.S. patent application Ser. No. 11/156,182 filed Jun. 17, 2005; and
U.S. patent application Ser. No. 11/156,110 filed Jun. 17, 2005.

Each of the above stated applications is hereby incorporated herein by reference in its entirety.

FIELD OF THE INVENTION

Certain embodiments of the invention relate to networking systems, methods and architectures. More specifically, certain embodiments of the invention relate to a method and system for supporting hardware acceleration for iSCSI read and write operations and iSCSI chimney.

BACKGROUND OF THE INVENTION

Innovations in data communications technology, fueled by bandwidth-intensive applications, have led to a ten-fold improvement in networking hardware throughput occurring about every four years. These network performance improvements, which have increased from 10 Megabits per second (Mbps) to 100 Mbps, and now to 1-Gigabit per second (Gbps) with 10-Gigabit on the horizon, have outpaced the capability of central processing units (CPUs). To compensate for this dilemma and to free up CPU resources to handle general computing tasks, offloading Transmission Control Protocol/Internet Protocol (TCP/IP) functionality to dedicated network processing hardware is a fundamental improvement. TCP/IP chimney offload maximizes utilization of host CPU resources for application workloads, for example, on Gigabit and multi-Gigabit networks.

TCP/IP chimney offload provides a holistic technique for segmenting TCP/IP processing into tasks that may be handled by dedicated network processing controller hardware and an operating system (OS). TCP/IP chimney offload redirects most of the TCP/IP related tasks to a network controller for processing, which frees up networking-related CPU resources overhead. This boosts overall system performance, and eliminates and/or reduces system bottlenecks. Additionally, TCP/IP chimney offload technology will play a key role in the scalability of servers, thereby enabling next-generation servers to meet the performance criteria of today's high-speed networks such as Gigabit Ethernet (GbE) networks.

Although TCP/IP offload is not a new technology, conventional TCP/IP offload applications have been platform specific and were not seamlessly integrated with the operating system's networking stack. As a result, these conventional offload applications were standalone applications, which were platform dependent and this severely affected deployment. Furthermore, the lack of integration within an operating system's stack resulted in two or more independent and different TCP/IP implementations running on a single server, which made such systems more complex to manage.

TCP/IP chimney offload may be implemented using a PC-based or server-based platform, an associated operating system (OS) and a TCP offload engine (TOE) network interface card (NIC). The TCP stack is embedded in the operating system of a host system. The combination of hardware offload for performance and host stack for controlling connections, results in the best OS performance while maintaining the flexibility and manageability of a standardized OS TCP stack. TCP/IP chimney offload significantly boosts application performance due to reduced CPU utilization. Since TCP/IP chimney offload architecture segments TCP/IP processing tasks between TOE's and an operating system's networking stack, all network traffic may be accelerated through a single TCP/IP chimney offload compliant adapter, which may be managed using existing standardized methodologies. Traditional TCP offload as well as TCP chimney offload are utilized for wired and wireless communication applications.

Internet Small Computer System Interface (iSCSI) is a TCP/IP-based protocol that is utilized for establishing and managing connections between IP-based storage devices, hosts and clients. The iSCSI protocol describes a transport protocol for SCSI, which operates on top of TCP and provides a mechanism for encapsulating SCSI commands in an IP infrastructure. The iSCSI protocol is utilized for data storage systems utilizing TCP/IP infrastructure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for supporting hardware acceleration for iSCSI read and write operations and iSCSI chimney, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for supporting hardware acceleration for iSCSI read and write operations via a TCP offload engine. Aspects of the method may comprise pre-registering at least one buffer with hardware. An iSCSI command may be received from an initiator. An initiator test tag value, a data sequence value and/or a buffer offset value of an iSCSI buffer may be compared with the pre-registered buffer. Data may be fetched from the pre-registered buffer based on the comparing of the initiator test tag value, the data sequence value and the buffer offset value of the iSCSI buffer with the pre-registered buffer. The fetched data may be zero copied from the pre-registered buffer to the initiator.

Figure 1:
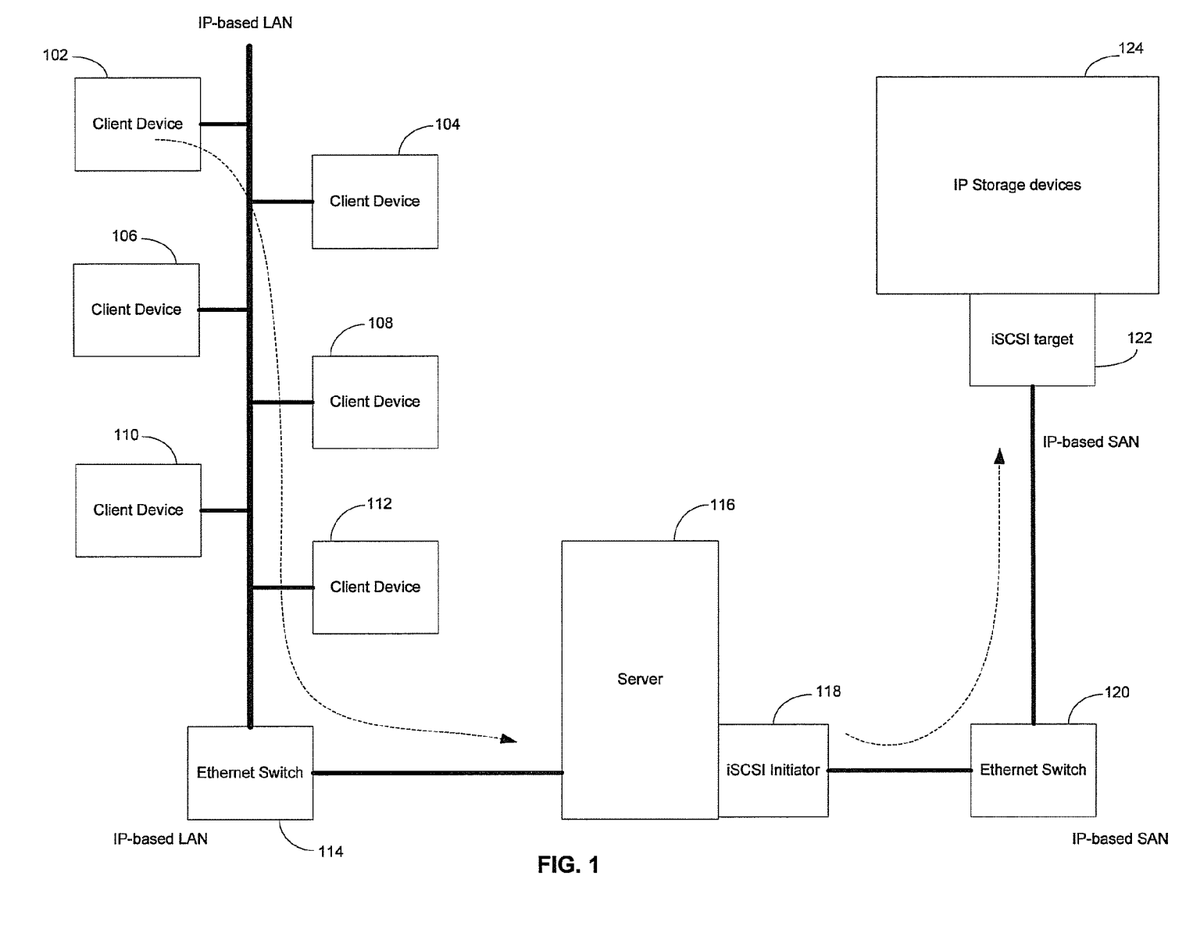
FIG. 1 is a block diagram of an exemplary system illustrating an iSCSI storage area network principle of operation that may be utilized in connection with an embodiment of the invention.

FIG. 1 is a block diagram of an exemplary system illustrating an iSCSI storage area network principle of operation that may be utilized in connection with an embodiment of the invention. Referring to FIG. 1, there is shown a plurality of client devices 102, 104, 106, 108, 110 and 112, a plurality of Ethernet switches 114 and 120, a server 116, an iSCSI initiator 118, an iSCSI target 122 and a storage device 124.

The plurality of client devices 102, 104, 106, 108, 110 and 112 may comprise suitable logic, circuitry and/or code that may be adapted to a specific service from the server 116 and may be a part of a corporate traditional data-processing IP-based LAN, for example, to which the server 116 is coupled. The server 116 may comprise suitable logic and/or circuitry that may be coupled to an IP-based storage area network (SAN) to which IP storage device 124 may be coupled. The server 116 may process the request from a client device that may require access to specific file information from the IP storage devices 124. The Ethernet switch 114 may comprise suitable logic and/or circuitry that may be coupled to the IP-based LAN and the server 116. The iSCSI initiator 118 may comprise suitable logic and/or circuitry that may be adapted to receive specific SCSI commands from the server 116 and encapsulate these SCSI commands inside a TCP/IP packet(s) that may be embedded into Ethernet frames and sent to the IP storage device 124 over a switched or routed SAN storage network. The Ethernet switch 120 may comprise suitable logic and/or circuitry that may be coupled to the IP-based SAN and the server 116. The iSCSI target 122 may comprise suitable logic, circuitry and/or code that may be adapted to receive an Ethernet frame, strip at least a portion of the frame, and recover the TCP/IP content. The iSCSI target may also be adapted to decapsulate the TCP/IP content, obtain SCSI commands needed to retrieve the required information and forward the SCSI commands to the IP storage device 124. The IP storage device 124 may comprise a plurality of storage devices, for example, disk arrays or a tape library.

The iSCSI protocol is one that enables SCSI commands to be encapsulated inside TCP/IP session packets, which may be embedded into Ethernet frames for subsequent transmissions. The process may start with a request from a client device, for example, client device 102 over the LAN to the server 116 for a piece of information. The server 116 may be adapted to retrieve the necessary information to satisfy the client request from a specific storage device on the SAN. The server 116 may then issue specific SCSI commands needed to satisfy the client device 102 and may pass the commands to the locally attached iSCSI initiator 118. The iSCSI initiator 118 may encapsulate these SCSI commands inside a TCP/IP packet(s) that may be embedded into Ethernet frames and sent to the storage device 124 over a switched or routed storage network.

The ISCSI target 122 may also be adapted to decapsulate the packet, and obtain the SCSI commands needed to retrieve the required information. The process may be reversed and the retrieved information may be encapsulated into TCP/IP segment form. This information may be embedded into one or more Ethernet frames and sent back to the iSCSI initiator 118 at the server 116, where it may be decapsulated and returned as data for the SCSI command that was issued by the server 116. The server may then complete the request and place the response into the IP frames for subsequent transmission over a LAN to the requesting client device 102.

Figure 2A:
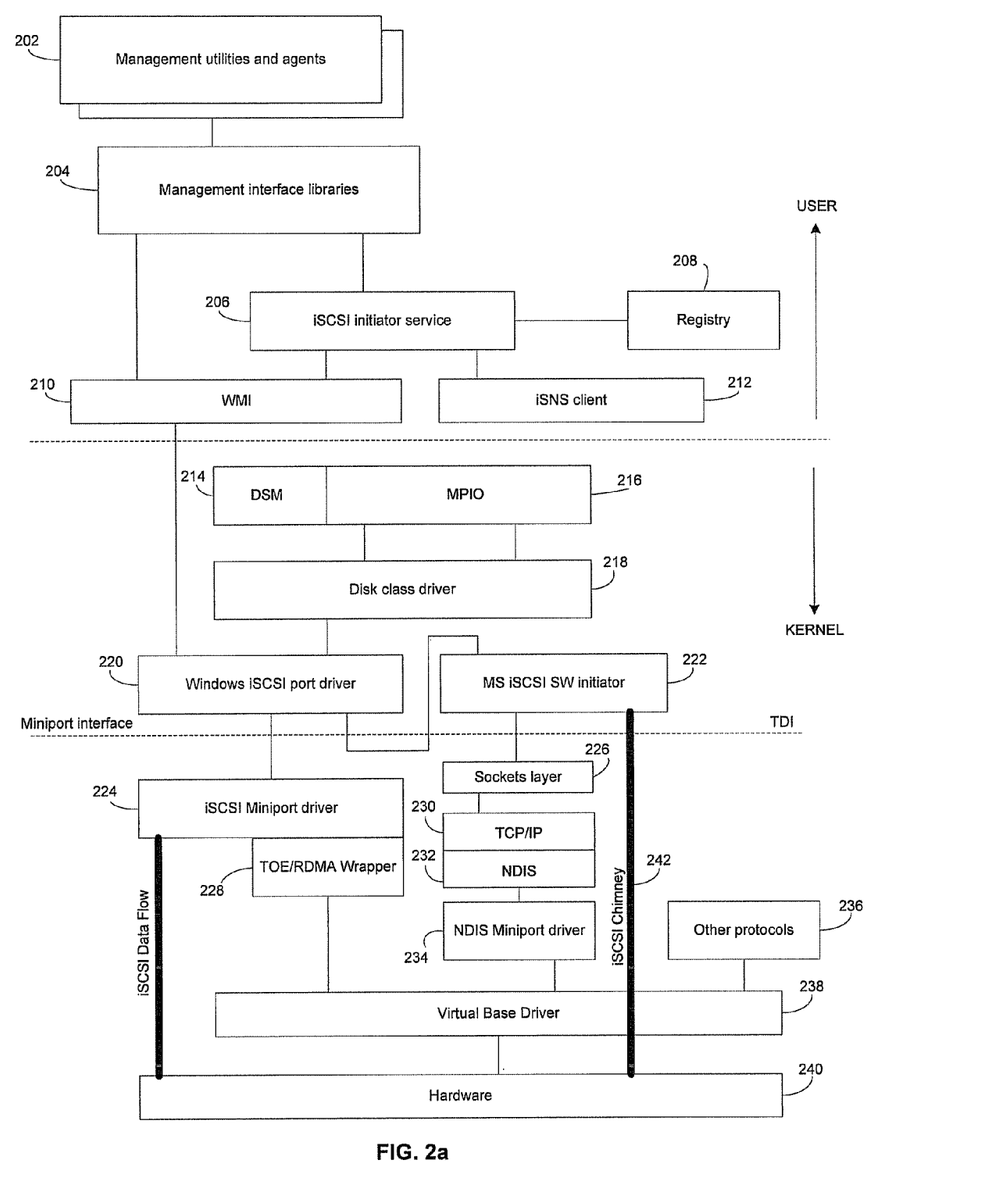
FIG. 2a is a block diagram illustrating the iSCSI software architecture in an iSCSI initiator application, in accordance with an embodiment of the invention.

FIG. 2a is a block diagram illustrating the iSCSI software architecture in an iSCSI initiator application, in accordance with an embodiment of the invention. The elements shown in FIG. 2a may be within the server 116 and the iSCSI initiator 118 of FIG. 1. Referring to FIG. 2a, there is shown a management utilities and agents block 202, a management interface libraries block 204, an iSCSI initiator service block 206, a registry block 208, a Windows Management Instrumentation (WMI) block 210, an Internet Storage Name Service (iSNS) client block 212, a device specific module (DSM) block 214, a multi-path input output (MPIO) block 216, a disk class driver block 218, a Windows iSCSI port driver block 220, an iSCSI software initiator block 222, a sockets layer block 226, a TCP/IP block 230, a network driver interface specification (NDIS) block 232, a NDIS miniport driver block 234, an iSCSI miniport driver block 224, a TCP offload engine (TOE)/remote direct memory access (RDMA) wrapper block 228, an other protocols block 236, a virtual bus driver block 238, a hardware block 240 and an iSCSI chimney 242. This diagram may be applicable to a target using the Microsoft Windows operating system, for example. For a target that utilizes another operating system, the hardware 240, the TCP/IP 230 and the iSCSI target entity may replace the Microsoft iSCSI SW initiator 222.

The management utilities and agents block 202 may comprise suitable logic, circuitry and/or code that may be adapted to configure device management and control panel applications. The management interface libraries block 204 may comprise suitable logic, circuitry and/or code that may be adapted to manage and configure various interface libraries in the operating system. The management interface libraries block 204 may be coupled to the management utilities and agents block 202, the iSCSI initiator service block 206 and the Windows Management Instrumentation (WMI) block 210. The iSCSI initiator service block 206 may be adapted to manage a plurality of iSCSI initiators, for example, network adapters and host bus adapters on behalf of the operating system.

The iSCSI initiator service block 206 may be adapted to aggregate discovery information and manage security. The iSCSI initiator service block 206 may be coupled to the management interface libraries block 204, the registry block 208, the iSNS client block 212 and the Windows Management Instrumentation (WMI) block 210. The registry block 208 may comprise a central hierarchical database that may utilized by an operating system, for example, Microsoft Windows 9x, Windows CE, Windows NT, and Windows 2000 to store information necessary to configure the system for one or more users, applications and hardware devices. The registry block 208 may comprise information that the operating system may reference during operation, such as profiles for each user, the applications installed on the computer and the types of documents that each may create, property sheet settings for folders and application icons, what hardware exists on the system, and the ports that are being used.

The Windows Management Instrumentation (WMI) block 210 may be adapted to organize individual data items properties into data blocks or structures that may comprise related information. Data blocks may have one or more data items. Each data item may have a unique index within the data block, and each data block may be named by a globally unique 128-bit number, for example, called a globally unique identifier (GUID). The WMI block 210 may be adapted to provide notifications to a data producer as to when to start and stop collecting the data items that compose a data block. The Windows Management Instrumentation (WMI) block 210 may be further coupled to the Windows iSCSI port driver block 220.

The Internet Storage Name Service (iSNS) client block 212 may comprise suitable logic, circuitry and/or code that may be adapted to provide both naming and resource discovery services for storage devices on an IP network. The iSNS client block 212 may be adapted to build upon both IP and Fiber Channel technologies. The iSNS protocol may use an iSNS server as the central location for tracking information about targets and initiators. The iSNS server may run on any host, target, or initiator on the network. The iSNS client software may be required in each host initiator or storage target device to enable communication with the server. In an initiator, the iSNS client block 212 may register the initiator and query the list of targets. In a target, the iSNS client block 212 may register the target with the server.

The multi-path input output MPIO block 216 may comprise generic code for vendors to adapt to their specific hardware device so that the operating system may provide the logic necessary for multi-path I/O for redundancy in case of a loss of a connection to a storage target. The device specific module DSM block 214 may play a role in a number of critical events, for example, device-specific initialization, request handling, and error recovery. During device initialization, each DSM block 214 may be contacted in turn to determine whether or not it may provide support for a specific device. If the DSM block 214 supports the device, it may then indicate whether the device is a new installation, or a previously installed device which is now visible through a new path. During request handling, when an application makes an I/O request to a specific device, the DSM block 214 may determine based on its internal load balancing algorithms, a path through which the request should be sent. If an I/O request cannot be sent down a path because the path is broken, the DSM block 214 may be capable of shifting to an error handling mode, for example. During error handling, the DSM block 214 may determine whether to retry the input/output (I/O) request, or to treat the error as fatal, making fail-over necessary, for example. In the case of fatal errors, paths may be invalidated, and the request may be rebuilt and transmitted through a different device path.

The disk class driver block 218 may comprise suitable logic, circuitry and/or code that may be adapted to receive application requests and convert them to SCSI commands, which may be transported in command description blocks (CDBs). The disk class driver block 218 may be coupled to the DSM block 214, the MPIO block 216, the Windows iSCSI port driver block 220 and the iSCSI software initiator block 222. In an operating system, for example, Windows, there might be at least two paths where the networking stack may be utilized. For example, an iSCSI software initiator block 222 may be adapted to support an iSCSI chimney 242 by allowing direct exchange of iSCSI CDBs, buffer information and data to and from the hardware 240 without further copying of the data. The second path may be to utilize an iSCSI miniport driver 224. The iSCSI miniport driver 224 may interface with the hardware 240 in the same fashion as described above for the iSCSI software initiator block 222. The use of a potential iSCSI chimney 242 from the hardware 240 to the iSCSI software initiator block 222 eliminates data copy and computing overhead from the iSCSI path but also allows the operating system to use one TCP stack for networking and storage providing a more robust solution as compared to using a third party TCP stack in the iSCSI storage stack. The TCP stack embedded in the TOE/RDMA wrapper 228 may be exposed to denial of service attacks and may be maintained. The interface between iSCSI software initiator block 222 and the hardware 240 may also be adjusted to support iSCSI over RDMA known as iSCSI extensions for RDMA (iSER). The second path may provide support for iSCSI boot, which is supported over the storage stack. The iSCSI boot capability may allow the initiator to boot from a disk attached to the system, for example, the server 116 (FIG. 1) over a network, and iSCSI to communicate with the disk. However for other operating systems the iSCSI chimney 242 may support both handling iSCSI data and control as well as iSCSI boot services over the networking stack and/or over the storage stack.

The Windows iSCSI port driver block 220 may comprise a plurality of port drivers that may be adapted to manage different types of transport, depending on the type of adapter, for example, USB, SCSI, iSCSI or Fiber Channel (FC) in use. The iSCSI software initiator block 222 may be adapted to function with the network stack, for example, iSCSI over TCP/IP and may support both standard Ethernet network adapters and TCP/IP offloaded network adapters, and may also be adapted to supporting an iSCSI chimney 242. The iSCSI software initiator block 222 may also support the use of accelerated network adapters to offload TCP overhead from a host processor to the network adapter. The iSCSI miniport driver block 224 may comprise a plurality of associate device drivers known as miniport drivers. The miniport driver may be adapted to implement routines necessary to interface with the storage adapter's hardware. A miniport driver may combine with a port driver to implement a complete layer in the storage stack. The miniport interface or the transport driver interface (TDI) may describe a set of functions through which transport drivers and TDI clients may communicate and the call mechanisms used for accessing them.

The iSCSI software initiator block 222 or any other software entity that manages and owns the iSCSI state or a similar entity for other operating systems may comprise suitable logic, circuitry and/or code that may be adapted to receive data from the Windows iSCSI port driver 220 and offload it to the hardware block 240 via the iSCSI chimney 242. On a target, the iSCSI software target block may also support the use of accelerated network adapters to offload TCP overhead from a host processor to a network adapter. The iSCSI software target block may also be adapted to use the iSCSI chimney 242.

The sockets layer 226 may be used by the TCP chimney and by any consumer that may need sockets services. The sockets layer 226 may be adapted to interface with the hardware 240 capable of supporting TCP chimney. For non-offloaded TCP communication, the TCP/IP block 230 may utilize transmission control protocol/internet protocol that may be adapted to provide communication across interconnected networks. The network driver interface specification NDIS block 232 may comprise a device-driver specification that may be adapted to provide hardware and protocol independence for network drivers and offer protocol multiplexing so that multiple protocol stacks may coexist on the same host. The NDIS miniport driver block 234 may comprise routines that may be utilized to interface with the storage adapter's hardware and may be coupled to the NDIS block 232 and the virtual bus driver (VBD) block 238. The VBD 238 may be required in order to simplify the hardware 240 system interface and internal handling of requests from multiple stacks on the host, however use of VBD 238 may be optional with the iSCSI chimney 242.

The iSCSI chimney 242 may comprise a plurality of control structures that may describe the flow of data between the iSCSI software initiator block 222 or the iSCSI miniport driver 224 and the hardware block 240 in order to enable a distributed and more efficient implementation of the iSCSI layer. The TOE/RDMA block 228 may comprise suitable logic, circuitry and/or code that may be adapted to implement remote direct memory access that may allow data to be transmitted from the memory of one computer to the memory of another computer without passing through either device's central processing unit (CPU). In this regard, extensive buffering and excessive calls to an operating system kernel may not be necessary. The TOE/RDMA block 228 may be coupled to the virtual bus driver block 238 and the iSCSI miniport driver block 224. Specifically to iSCSI, it may be adapted to natively support iSER, or NFS over RDMA or other transports relying on RDMA services. These RDMA services may also be supported on a target.

The virtual bus driver block 238 may comprise a plurality of drivers that facilitate the transfer of data between the iSCSI software initiator block 222 and the hardware block 240 via the iSCSI chimney 242. The virtual bus driver block 238 may be coupled to the TOE/RDMA block 228, NDIS miniport driver block 234, the sockets layer block 226, the other protocols block 236 and the hardware block 240. The other protocols block 236 may comprise suitable logic, circuitry and/or code that may be adapted to implement various protocols, for example, the Fiber Channel Protocol (FCP) or the SCSI-3 protocol standard to implement serial SCSI over Fiber Channel networks. The hardware block 240 may comprise suitable logic and/or circuitry that may be adapted to process received data from the drivers, the network interface and other devices coupled to the hardware block 240.

The iSCSI initiator 118 [FIG. 1] and iSCSI target 122 devices on a network may be named with a unique identifier and assigned an address for access. The iSCSI initiators 118 and iSCSI target nodes 122 may either use an iSCSI qualified name (IQN) or an enterprise unique identifier (EUI). Both types of identifiers may confer names that may be permanent and globally unique. Each node may have an address comprised of the IP address, the TCP port number, and either the IQN or EUI name. The IP address may be assigned by utilizing the same methods commonly employed on networks, such as dynamic host control protocol (DHCP) or manual configuration. During discovery phase, the iSCSI software initiator 222 or the iSCSI miniport driver 224 may be able to determine or accept it for the management layers WMI 210, iSCSI initiator services 206, management interface libraries 204 and management utilities and agents 202 for both the storage resources available on a network, and whether or not access to that storage is permitted. For example, the address of a target portal may be manually configured and the initiator may establish a discovery session. The target device may respond by sending a complete list of additional targets that may be available to the initiator.

The Internet Storage Name Service (iSNS) is a device discovery protocol that may provide both naming and resource discovery services for storage devices on the IP network and builds upon both IP and Fibre Channel technologies. The protocol may utilize an iSNS server as a central location for tracking information about targets and initiators. The server may be adapted to run on any host, target, or initiator on the network. The iSNS client software may be required in each host initiator or storage target device to enable communication with the server. In the initiator, the iSNS client may register the initiator and may query the list of targets. In the target, the iSNS client may register the target with the server.

For the initiator to transmit information to the target, the initiator may first establish a session with the target through an iSCSI logon process. This process may start the TCP/IP connection, and verify that the initiator has access rights to the target through authentication. The initiator may authorize the target as well. The process may also allow negotiation of various parameters including the type of security protocol to be used, and the maximum data packet size. If the logon is successful, an ID may be assigned to both the initiator and the target. For example, an initiator session ID (ISID) may be assigned to the initiator and a target session ID (TSID) may be assigned to the target. Multiple TCP connections may be established between each initiator target pair, allowing more transactions during a session or redundancy and fail over in case one of the connections fails.

Figure 2B:
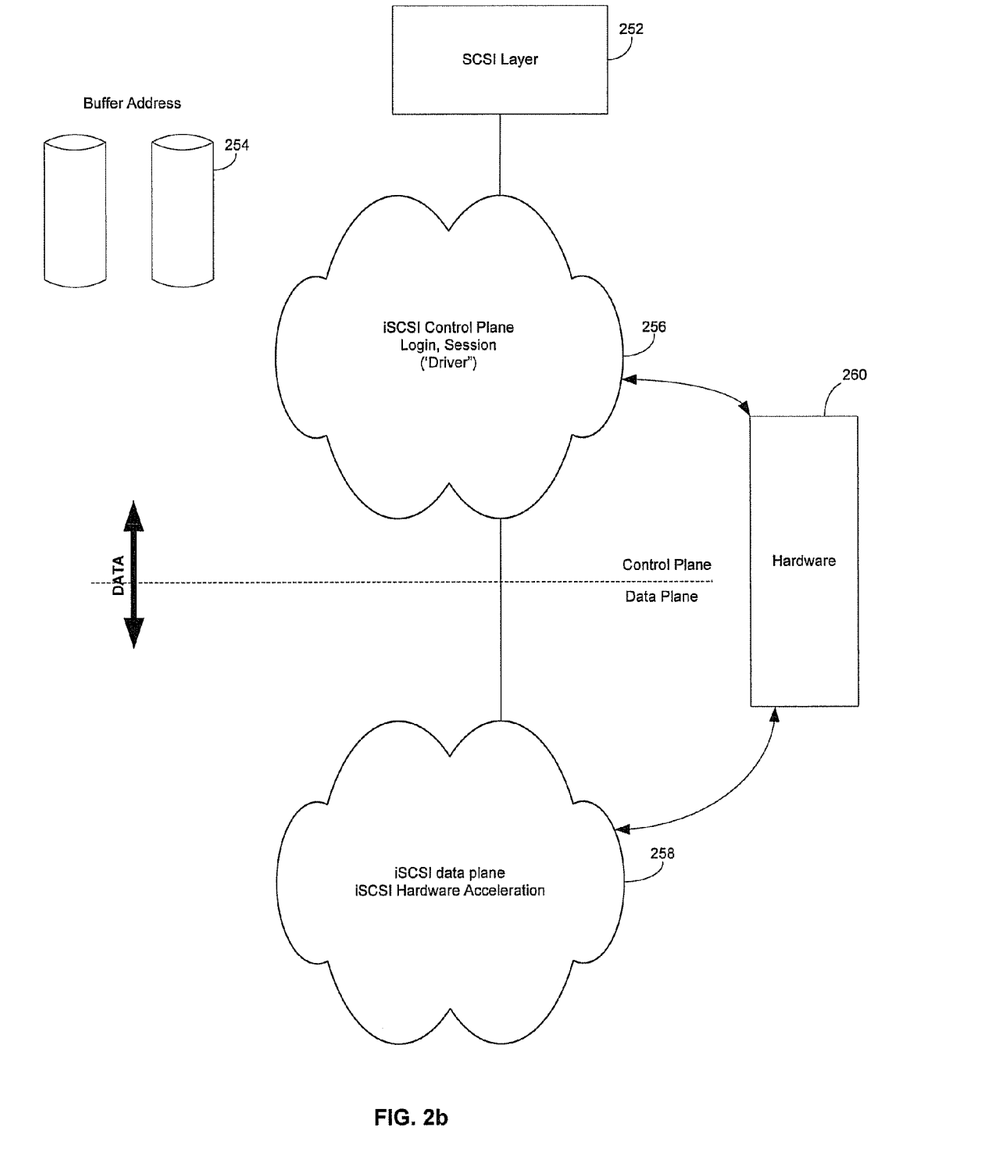
FIG. 2b is a block diagram illustrating the flow of data between the control plane and the data plane in the iSCSI architecture, in accordance with an embodiment of the invention.

FIG. 2b is a block diagram illustrating the flow of data between the control plane and the data plane in the iSCSI architecture, in accordance with an embodiment of the invention. Referring to FIG. 2b, there is shown a SCSI layer block 252, a set of buffer addresses 254, each pointing to data storage buffers, an iSCSI control plane block 256, which performs the control plane processing and the iSCSI data plane block 258, which performs the data plane processing and the hardware block 260. Both the control plane 256 and the data plane 258 may have connections to the hardware block 260 to allow communications to the IP network. The SCSI layer block 252 may comprise a plurality of functional blocks, for example, a disk class driver block 218 (FIG. 2a) and the iSCSI software initiator block 222 that may be adapted to support the use of various SCSI storage solutions, including SCSI HBA, Fiber Channel HBA, iSCSI HBA, and accelerated network adapters to offload TCP and iSCSI overhead from a host processor to the network adapter. The buffer address block 254 may comprise a plurality of points to buffers that may be adapted to store data delivered to or received from the driver. The iSCSI control plane block 256 may comprise suitable logic, circuitry and/or code that may be adapted to provide streamlined storage management. The control plane utilizes a simple network connection to handle login, and session management. These operations may not be considered to be time critical. A large amount of state may be required for logic and session management. When the SCSI layer 252 requires a high performance operation such as read or write, the control plane may assign an ITT to the operation and pass the request to the data plane. The control plane may handle simple overhead operations required for the command such as timeouts.

During the discovery phase, the iSCSI initiators 222 (FIG. 2a) may have the capability to determine both the storage resources available on a network, and whether or not access to that storage is permitted. For example, the address of a target portal may be manually configured and the initiator may establish a discovery session. The target device may respond by sending a complete list of additional targets that may be available to the initiator. The Internet Storage Name Service (iSNS) protocol may utilize an iSNS server as a central location for tracking information about targets and initiators. The server may be adapted to run on any host, target, or initiator on the network.

The iSNS client software may be required in each host initiator or storage target device to enable communication with the server. In the initiator, the iSNS client may register the initiator and may query the list of targets. In the target, the iSNS client may register the target with the server. For the initiator to transmit information to the target, the initiator may first establish a session with the target through an iSCSI logon process. This process may start the TCP/IP connection, verify that the initiator has access to the target (authentication), and allow negotiation of various parameters including the type of security protocol to be used, and the maximum data packet size. If the logon is successful, an ID such as an initiator session ID (ISID) may be assigned to initiate and an ID such as a target session ID (TSID) may be assigned to the target.

The iSCSI data plane block 258 may comprise suitable logic, circuitry and/or code that may be adapted to process performance oriented transmitted and received data from the drivers and other devices to/from the hardware block 260. The control plane may be adapted to pass a CDB to the data plane. The CDB may comprise the command, for example, a read or write of specific location on a specific target, buffer pointers, and an initiator transfer tag (ITT) value unique to the CDB. When the data plane 258 has completed the operation, it may return a status to the control plane 256 indicating if the operation was successful or not.

Figure 3:
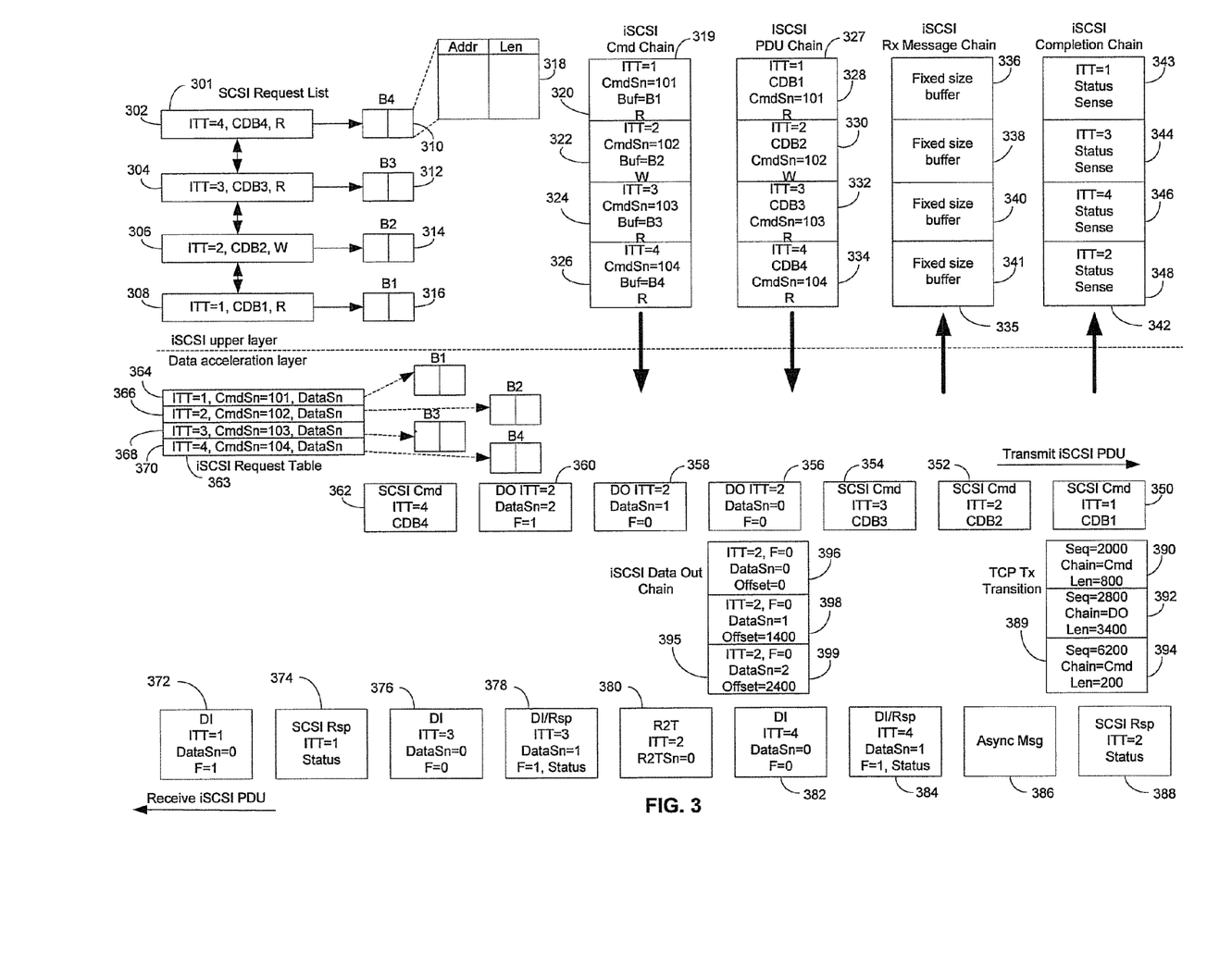
FIG. 3 is a block diagram of an exemplary iSCSI chimney, in accordance with an embodiment of the invention.

FIG. 3 is a block diagram of an exemplary iSCSI chimney, in accordance with an embodiment of the invention. Referring to FIG. 3, there is shown, a SCSI request list 301, a set of buffers B1 316, B2 314, B3 312 and B4 310, each buffer, for example, B4 318 may have a list of physical buffer addresses and lengths associated with it, an iSCSI command chain 319, an iSCSI PDU chain 327, an iSCSI Rx message chain 335 an iSCSI completion chain 342 in the iSCSI upper layer representing state maintained by a software driver or on HBA. Also shown in FIG. 3 is the state maintained by the hardware that comprises an iSCSI request table 363, a set of SCSI command blocks 350, 352, 354 and 362, a set of data out blocks 356, 358 and 360, a TCP transition table 389, an iSCSI data out chain 395, a set of data in blocks 372, 376, 378, 382, 384, a set of status indicator blocks 374 and 388, a request to transmit (R2T) block 380 and an asynchronous message block 386 in the data acceleration layer.

The SCSI request list 301 may comprise a set of command descriptor blocks (CDBs) 302, 304, 306 and 308. The iSCSI command chain 319 may comprise a set of command sequence blocks 320, 322, 324 and 326. The iSCSI PDU chain 327 may comprise a set of CDBs 328, 330, 332 and 334. The iSCSI message chain 335 may comprise a set of fixed size buffers 336, 338, 340 and 341. The iSCSI completion chain 342 may comprise a set of status blocks 343, 344, 346 and 348. The iSCSI request table 363 may comprise a set of command sequence blocks 364, 366, 368 and 370. The TCP transition table 389 may comprise a set of sequence blocks 390, 392 and 394 and the iSCSI data out chain 395 may comprise a set of data out blocks 396, 398 and 399.

The command descriptor block (CDB) 302 has an initiator task tag (ITT) value 4, corresponding to CDB4 and performs a read operation, for example. The CDB 304 has an ITT value 3, corresponding to CDB3 and performs a read operation, for example. The CDB 306 has an ITT value 2, corresponding to CDB2 and performs a write operation, for example and the CDB 308 has an ITT value 1, corresponding to CDB1 and performs a read operation, for example. Each of the CDBs 302, 304, 306 and 308 may be mapped to a corresponding buffer B4 310, B3 312, B2 314 and B1 316 respectively. Each of the buffers B4 310, B3 312, B2 314 and B1 316 may be represented as shown in block 318 with an address of a data sequence to be stored and its corresponding length. The ITT value may be managed by the data acceleration layer. Before an iSCSI upper layer submits a request, it requests the data acceleration layer for the ITT value. The ITT value may be allocated from the iSCSI request table 363 by the iSCSI upper layer to uniquely identify the command. The ITT value may be chosen such that when a corresponding iSCSI PDU, for example, an iSCSI data length (DataIn) PDU or an iSCSI R2T PDU arrive, the data acceleration layer may readily identify the entry inside the iSCSI request table using the ITT or a portion of the ITT.

The iSCSI command chain 319 may comprise a set of exemplary command sequence blocks (CSBs) 320, 322, 324 and 326. The CSB 320 has associated ITT value 1, command sequence (CmdSn) value 101, buffer B1 316 and is a read operation, for example. The CSB 322 has associated ITT value 2, CmdSn value 102, buffer B2 314 and is a write operation, for example. The CSB 324 has associated ITT value 3, CmdSn value 103, buffer B3 312 and is a read operation, for example. The CSB 324 has associated ITT value 4, CmdSn value 104, buffer B4 310 and a read operation, for example. The iSCSI PDU chain 327 may comprise a set of exemplary CDBs 328, 330, 332 and 334. The CDB 328 has associated ITT value 1, CmdSn value 101 and read operation, for example. The CDB 330 has associated ITT value 2, CmdSn value 102 and write operation, for example. The CDB 332 has associated ITT value 3, CmdSn value 103 and read operation, for example. The CDB 334 has associated ITT value 4, CmdSn value 104 and is a read operation, for example. The iSCSI message chain 335 may comprise a set of exemplary fixed size buffers 336, 338, 340 and 341 corresponding to each of the CDBs 320, 322, 324 and 326 respectively. The iSCSI completion chain 342 may comprise a set of status blocks 343, 344, 346 and 348 and may have corresponding ITT value 1, ITT value 3, ITT value 4 and ITT value 2 respectively, for example.

The iSCSI request table 363 may comprise a set of command sequence blocks 364, 366, 368 and 370. The CSB 364 has associated ITT value 1, CmdSn value 101, data sequence (DataSn) and buffer B1, for example. The CSB 366 may have associated ITT value 2, CmdSn value 102, data sequence (DataSn) and buffer B2, for example. The CSB 368 may have associated ITT value 3, CmdSn value 103, data sequence (DataSn) and buffer B3, for example. The CSB 370 may have associated ITT value 4, CmdSn value 104, data sequence (DataSn) and buffer B4, for example. By arranging the commands in the iSCSI request table 363, a portion of the ITT may be chosen as the index to the entry inside the iSCSI request table 363. When a command is completed, the corresponding iSCSI request table entry may be marked as completed without re-arranging other commands. The CDBs 320, 322, 324 and 326 may be completed in any order. Once the iSCSI request table entry is marked completed, the data acceleration layer may stop any further data placement into the buffer.

Notwithstanding, in another embodiment of the invention, when the iSCSI request table 363 is full, the iSCSI upper layer may still be able to send commands by building at the iSCSI upper layer. The iSCSI request table 363 may not need to be sized beforehand and the iSCSI chimney 242 may continue to work even if the number of command requests exceeds the capability of the data acceleration layer or the size of iSCSI request table 363.

The SCSI command blocks 350, 352, 354 and 362 has associated exemplary ITT value 1, ITT value 2, ITT value 3 and ITT value 4 respectively. The data out block 356 has associated ITT value 2, DataSn value 0 and final (F) value 0, for example. The data out block 358 has associated ITT value 2, DataSn value 1 and final (F) value 0, for example. The data out block 360 has associated ITT value 2, DataSn value 2 and final (F) value 1, for example. The TCP transition table 389 may comprise a set of sequence blocks 390, 392 and 394. The sequence block 390 may correspond to a sequence 2000 and length 800, for example. The sequence block 392 may correspond to a sequence 2800 and length 3400, for example. The sequence block 394 may correspond to a sequence 6200 and length 200, for example. There may not be a fixed association between a SCSI PDU and a TCP bit, and a bit may have a fixed value associated with it.

The TCP transition table 389 may be adapted to store a copy of requests sent to the iSCSI request table 363, to enable it to retransmit the TCP bits. The iSCSI data out chain 395 may comprise a set of corresponding data out blocks 396, 398 and 399. The data out block 396 has associated ITT value 2, final (F) value 0, DataSn value 0 and offset value 0, for example. The data out block 398 has associated ITT value 2, final (F) value 0, DataSn value 1 and offset value 1400, for example. The data out block 399 has associated ITT value 2, final (F) value 0, DataSn value 2 and offset value 2400, for example. The iSCSI data out chain 395 may be adapted to receive a R2T signal from the R2T block 380, for example, compare it with previously stored data and generate a data out (DO) signal to the data out block 356, for example. The data acceleration layer may be capable of handling the R2T. The ITT field of the R2T PDU 380 may be used to lookup the iSCSI request table 363. The iSCSI request table entry 366 and the associated buffer B2 may be identified. The data acceleration layer formats the data out PDUs 356, 358 and 360. The data out PDUs 356, 358 and 360 may be transmitted out. The iSCSI upper layer may not involve R2T processing.

The data in block 372 has associated ITT value 1, DataSn value 0 and final F value 1, for example. The data in block 376 has associated ITT value 3, DataSn value 0 and final (F) value 0, for example. The data in block 378 has associated ITT value 3, DataSn value 1, final (F) value 1 and a status signal (Status), for example. The data in block 382 has associated ITT value 4, DataSn value 0 and final (F) value 0, for example. The data in block 384 has associated ITT value 4, DataSn value 1, final (F) value 1 and a status signal (Status), for example. The status indicator block 374 has associated ITT value 1 and a status signal (Status), for example, and the status indicator block 388 has associated ITT value 2 and a status signal Status, for example. The request to transmit (R2T) block 380 may be adapted to send a R2T signal to the iSCSI data out chain block 396, for example, which may further send a data out signal to the data out block 356. The asynchronous message block may be adapted to send an asynchronous message signal to the fixed size buffer 336, for example.

In operation, the iSCSI chimney may comprise a plurality of control structures that may describe the flow of data between an initiator and the hardware in order to enable a distributed implementation. The SCSI construct may be blended on the iSCSI layer so that it may be encapsulated inside TCP data before it is transmitted to the hardware for data acceleration. There may be a plurality of read and write operations, for example, three read operations and a write operation may be performed to transfer a block of data from the initiator to a target. The read operation may comprise information, which describes an address of a location where the received data may be placed. The write operation may describe the address of the location from which the data may be transferred. The SCSI request list 301 may comprise a set of command descriptor blocks 302, 304, 306 and 308 for read and write operations and each CDB may be associated with a corresponding buffer B4 310, B3 312, B2 314 and B1 316 respectively. The driver may be adapted to recode the information stored in the SCSI request list 301 into the iSCSI command chain 319. The iSCSI command chain 319 may comprise a set of command sequence blocks (CSBs) 320, 322, 324 and 326 and each CSB may be converted into a PDU in the iSCSI PDU chain 327, which may comprise a set of CDBs 328, 330, 332 and 334, respectively.

The iSCSI command chain CDB 320 may be utilized to send a read command to the SCSI command block 350 and simultaneously updates the TCP transition table sequence block 390 and the iSCSI request table command sequence block 364. The iSCSI request table 363 may be associated with the same set of buffers as the SCSI request list in the iSCSI upper layer. The iSCSI command chain CDB 322 may be utilized to update the iSCSI request table command sequence block 366 associated with buffer B2 314, create a header and may send out a write command to the SCSI command block 352. The iSCSI command chain CDB 324 may be utilized to send a read command to the SCSI command block 354 and simultaneously updates the TCP transition table sequence block 392 and the iSCSI request table command sequence block 368.

The data in block 372 may indicate receipt of data from the initiator and compare the received data with the data placed in the buffer B1 316 associated with the iSCSI request table CSB 364 and place the received data in the buffer B1 316. The status indicator block 374 may send a status signal to the iSCSI completion chain status block 342, which indicates the completion of the read operation and free the iSCSI request table CSB 364. The data in block 376 may indicate the receipt of data from the initiator and compare the received data with the data placed in the buffer B3 312 associated with the iSCSI request table CSB 368 and place the received data in the buffer B3 312. The status indicator block 378 may be utilized to send a status signal to the iSCSI completion chain status block 344, which indicates the completion of the read operation and free the iSCSI request table CSB 368.

When handling the iSCSI write commands, the iSCSI host driver may submit the associated buffer information with the allocated ITT to the iSCSI offload hardware. The iSCSI host driver may deal with the completion of the iSCSI write command, when the corresponding iSCSI response PDU is received. The iSCSI target may request the write data at any pace and at any negotiated size by sending the initiator one or multiple iSCSI ready to transfer (R2T) PDUs. In iSCSI processing, these R2T PDUs may be parsed and the write data as specified by the R2T PDU may be sent in the iSCSI data out PDU encapsulation. With iSCSI chimney, R2T PDUs may be handled by the iSCSI offload hardware that utilizes ITT in R2T PDU to locate the outstanding write command, and use offset and length in R2T PDU to formulate the corresponding data out PDU. The processing for the iSCSI host driver may be reduced by not involving the host driver.

The R2T block 380 may be adapted to send a R2T signal to the iSCSI data out chain block 396 with DataSn value 0, for example, which may be adapted to send a data out signal to the data out block 356 with DataSn value 0 and final F value 0, for example. The R2T block 380 may be adapted to simultaneously update the iSCSI data out chain block 396 and the iSCSI request table command sequence block 366. The iSCSI request table command sequence block 366 may compare the received data with the data placed in the buffer B2 314 and transmit the data to be written to the data out block 356. The iSCSI data out chain 395 may be adapted to record write commands being transmitted and compare it with a received R2T signal. The R2T block 380 may be adapted to send a R2T signal to the iSCSI data out chain block 398 with DataSn value 1, for example, which may be utilized to send a data out signal to the data out block 358 with DataSn value 1 and final (F) value 0, for example. The R2T block 380 may be further adapted to send a R2T signal to the iSCSI data out chain block 399, which may have DataSn value 2, for example. The R2T block 380 may further send a data out signal to the data out block 360, which may have DataSn value 2 and final (F) value 1, for example.

The iSCSI command chain CDB 326 may be utilized to send a read command to the SCSI command block 362, which may simultaneously update the TCP transition table sequence block 394 and the iSCSI request table command sequence block 370. The data in block 382 may indicate the receipt of data from the initiator and compare the received data with the data placed in the buffer B4 310 associated with the iSCSI request table CSB 370 and place the received data in the buffer B4 310. The status indicator block 384 may send a status signal to the iSCSI completion chain status block 346, which may indicate the completion of the read operation and free the iSCSI request table CSB 370. The status indicator block 388 may send a status signal to the iSCSI completion chain status block 348, which may indicate completion of the write operation and free the iSCSI request table CSB 366. When the CPU enters idle mode, the iSCSI completion chain 341 may receive the completed status commands for the read and write operations and the corresponding buffers and entries in the iSCSI request table 363 may be freed for the next set of operations.

Figure 4:
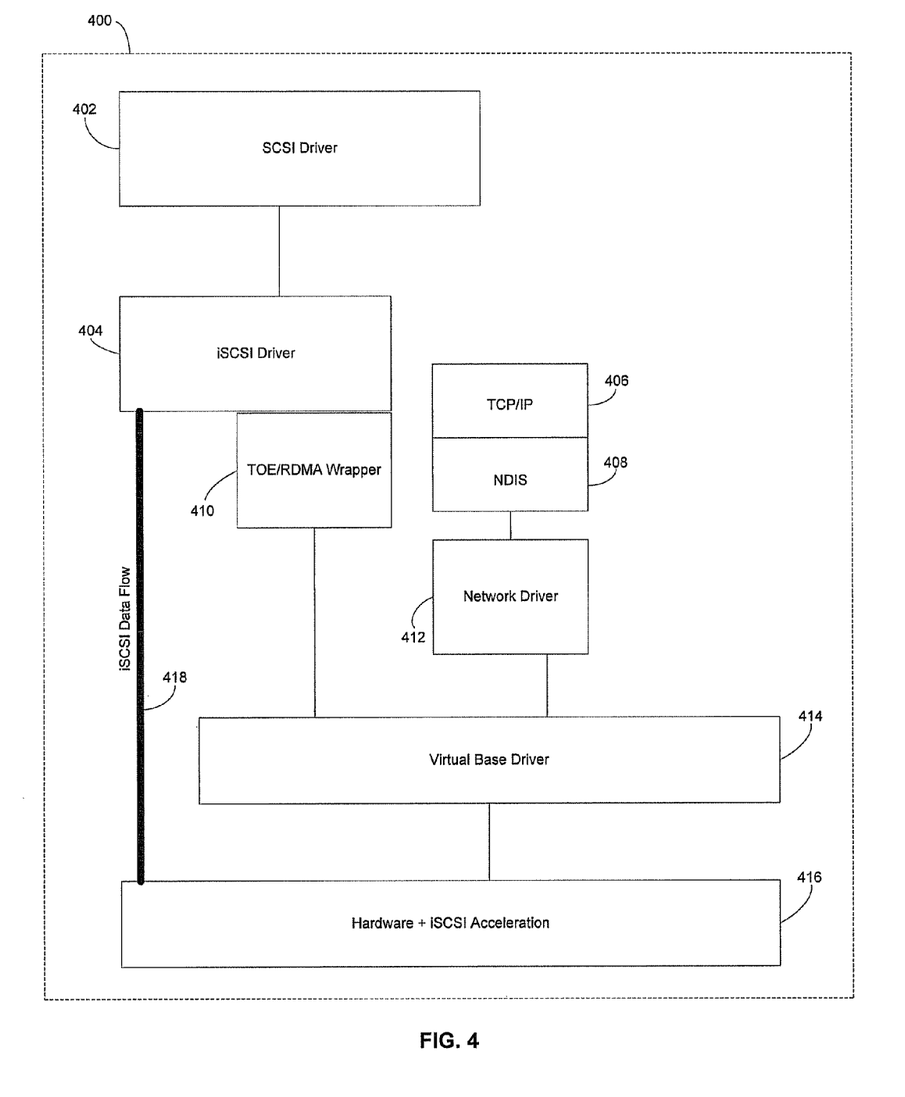
FIG. 4 is a block diagram illustrating iSCSI offload of data via a TCP offload engine (TOE), with iSCSI acceleration in hardware, in accordance with an embodiment of the invention.

FIG. 4 is a block diagram illustrating iSCSI offload of data via a TCP offload engine (TOE), with iSCSI acceleration in hardware, in accordance with an embodiment of the invention. Referring to FIG. 4, there is shown a storage stack 400. The storage stack 400 may comprise a SCSI layer block 402, an iSCSI driver block 404, a TOE/RDMA wrapper block 410, a TCP/IP block 406, a NDIS block 408, a network driver block 412, a virtual base driver block 414, a hardware block with iSCSI acceleration 416 and an iSCSI chimney 418.

The SCSI layer block 402 may comprise a plurality of functional blocks, for example, a disk class driver block 218 (FIG. 2) and the iSCSI software initiator block 222, which may be adapted to support the use of accelerated network adapters to offload TCP overhead processing from a host processor to a network adapter. The iSCSI driver block 404 may comprise a plurality of port drivers that may be adapted to manage different types of transport technologies, depending on the type of adapter, which is utilized, such as, for example, USB, SCSI or Fibre Channel (FC). The TCP/IP block 406 comprises the transmission control protocol/Internet protocol that may be adapted to provide communication across interconnected networks. The network driver interface specification NDIS block 408 may comprise a device-driver specification that may be adapted to provide hardware and protocol independence for network drivers and offer protocol multiplexing so that multiple protocol stacks may coexist on the same host. The network driver block 412 may comprise a plurality of routines that may interface with the storage adapter's hardware and may be coupled to the NDIS block 408 and the virtual base driver block 414.

The iSCSI chimney 418 may comprise a plurality of control structures that may define a manner in which data flows between the iSCSI driver block 404 and the hardware block 416 in order to enable a distributed implementation. The virtual base driver block 414 may comprise a plurality of drivers that facilitate the transfer of data between the iSCSI driver block 404 and the hardware block 416 via the iSCSI chimney 418. The hardware block 416 may comprise suitable logic and/or circuitry that may be adapted to process received data from the drivers and other devices coupled to the hardware block 416. The iSCSI driver block 404 may be implemented in a hardware adapter card instead of the host software. The iSCSI host bus adapters (HBAs) may support iSNS discovery. In an embodiment of the invention, iSNS discovery may be integrated within an initiator service in HBA configurations to perform device discovery and may ensure multiple sessions to the same target.

Figure 5:
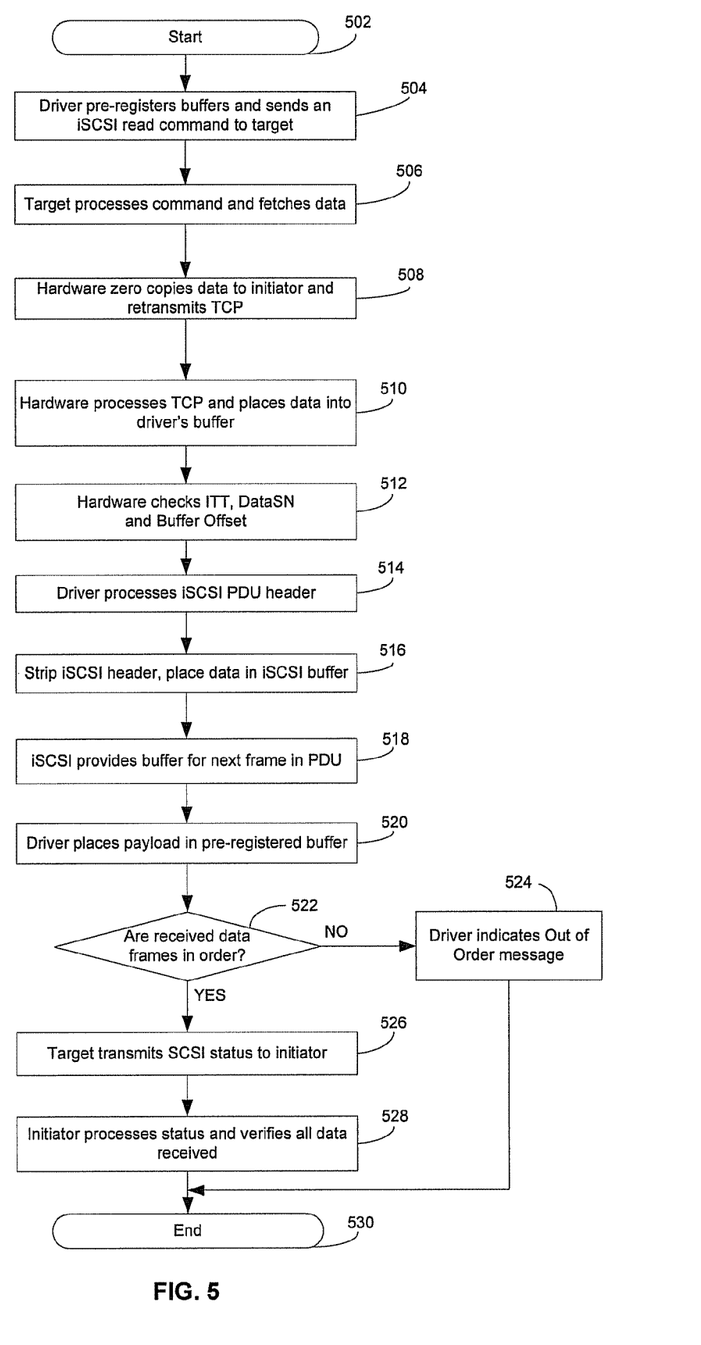
FIG. 5 is a flowchart illustrating exemplary steps that may be utilized for performing iSCSI read operations via a TCP offload engine (TOE), with iSCSI acceleration in hardware, in accordance with an embodiment of the invention.

FIG. 5 is a flowchart illustrating exemplary steps that may be utilized for performing iSCSI read operations via a TCP offload engine (TOE), with iSCSI acceleration in hardware, in accordance with an embodiment of the invention. Referring to FIG. 5, the exemplary steps may start at step 502. In step 504, the driver pre-registers buffers and sends an iSCSI read command to the target. The iSCSI read command may comprise an initiated task tag (ITT), a SCSI read command descriptor block (CDB) and the length of the data stream. In step 506, the target may receive the iSCSI read command from the initiator, process it and fetch data from a storage device. In step 508, the hardware may zero copy the data to the initiator and retransmit TCP data to the initiator. The TCP data sent to the initiator may comprise an ITT, a data sequence number (DataSn) and a buffer offset value.

In step 510, the hardware processes TCP and places data into the driver's buffer. In step 512, the hardware may check the initiated task tag (ITT), the Data Sequence number (DataSn) and a buffer offset value. In step 514, the driver may process the iSCSI PDU header and in step 516, the iSCSI header may be stripped and data may be placed in an iSCSI buffer. In step 518, the iSCSI protocol may provide a buffer for the next frame in the PDU and in step 520, the driver may place the payload in a pre-registered buffer. In step 522, the initiator may check if the received data frames are in the correct order. If the received data frames are not in correct order, in step 524, the driver may indicate an out-of-order (OOO) message and control passes to the end step 530. If the received data frames are in the correct order, in step 526, the target may transmit a SCSI status signal to the initiator. In step 528, the initiator may process the received SCSI status signal from the target, verify the received data and control then passes to the end step 530.

Figure 6:
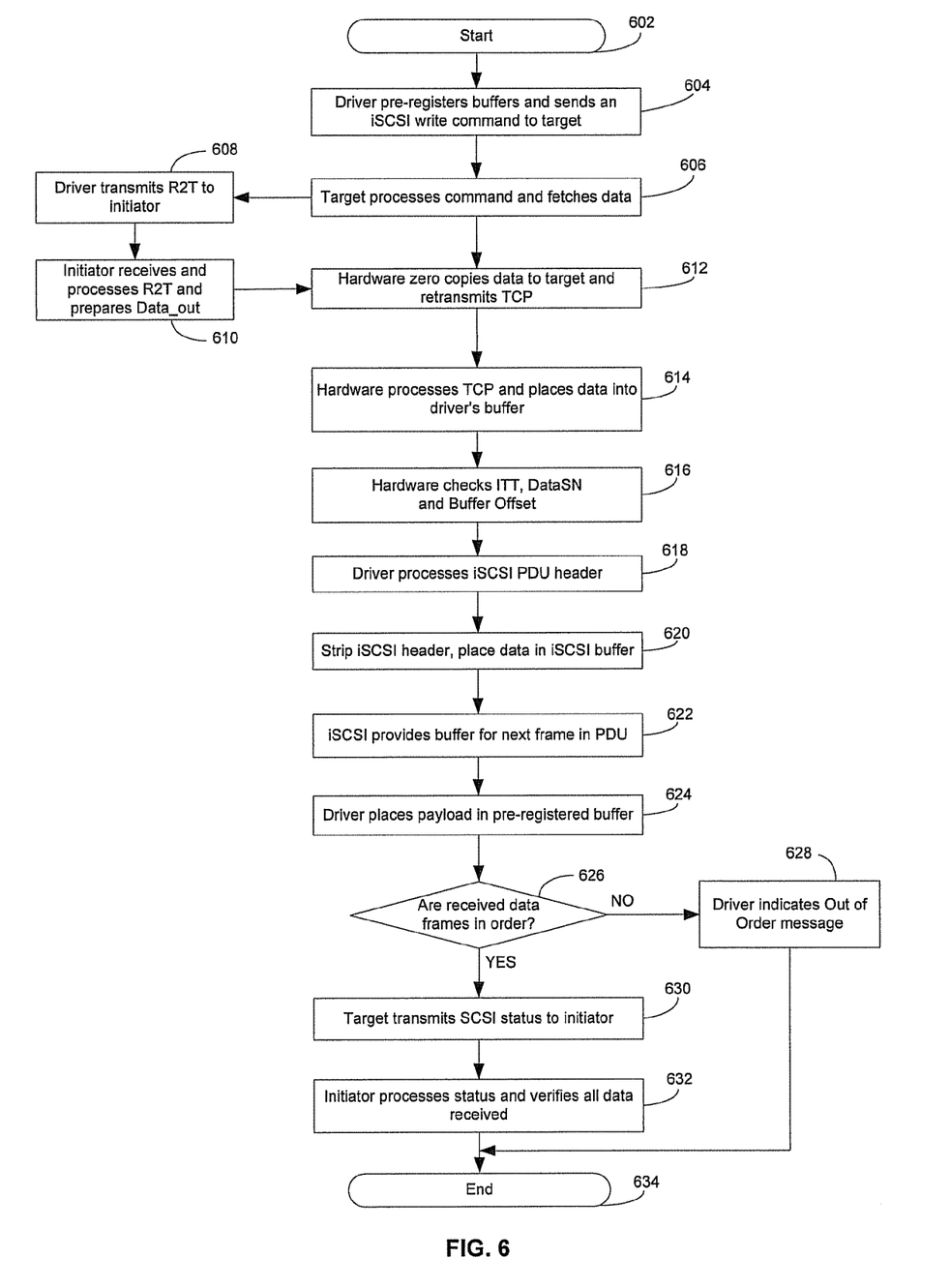
FIG. 6 is a flowchart illustrating exemplary steps that may be utilized for performing iSCSI write operations via a TCP offload engine (TOE), with iSCSI acceleration in hardware, in accordance with an embodiment of the invention.

FIG. 6 is a flowchart illustrating exemplary steps that may be utilized for performing SCSI write operations via a TCP offload engine (TOE), with iSCSI acceleration in hardware, in accordance with an embodiment of the invention. Referring to FIG. 6, the exemplary steps may start at step 602. In step 604, the driver pre-registers buffers and sends an iSCSI write command to the target. The iSCSI write command may comprise an initiated task tag (ITT), a SCSI write command descriptor block (CDB) and the length of the data stream. In step 606, the target may receive the iSCSI write command from the initiator, process it and fetch data from a storage device. In step 608, the driver may transmit a request to transmit (R2T) signal to the initiator. In step 610, the initiator may receive and process the R2T signal and prepare the data out packet to be sent out.

In step 612, hardware may zero copy the data to the initiator and retransmit TCP to the initiator. The data sent to the initiator may comprise an ITT, a data sequence number (DataSn) and a buffer offset value. In step 614, the hardware processes TCP and places data into the driver's buffer. In step 616, the hardware may check the initiated task tag (ITT), the Data Sequence number (DataSn) and a buffer offset value. In step 618, the driver may process the iSCSI PDU header and in step 620, the iSCSI header may be stripped and data may be placed in an iSCSI buffer. In step 622, the iSCSI protocol may provide a buffer for the next frame in the PDU and in step 624, the driver may place the payload in a pre-registered buffer. In step 626, the initiator may check if the received data frames are in the correct order. If the received data frames are not in correct order, in step 628, the driver may indicate an out-of-order message and control passes to the end step 634. If the received data frames are in the correct order, in step 630, the target may transmit a SCSI status signal to the initiator. In step 632, the initiator may process the received SCSI status signal from the target, verify the received data and control then passes to the end step 634.

Certain embodiments of the invention may be found in a method and system for supporting hardware acceleration for iSCSI read and write operations via a TCP offload engine. Aspects of the method may comprise pre-registering at least one buffer with hardware. An iSCSI command may be received from an initiator. An initiator test tag value, a data sequence value and/or a buffer offset value of an iSCSI buffer may be compared with the pre-registered buffer. Data may be fetched from the pre-registered buffer based on the comparing of the initiator test tag value, the data sequence value and the buffer offset value of the iSCSI buffer with the pre-registered buffer. The fetched data may be zero copied from the pre-registered buffer to the initiator.

A request to transmit (R2T) signal may be communicated to the initiator. A target may receive a transmitted data out signal. A retransmitted TCP sequence may be received by the target from the initiator in response to receiving a first frame of the zero copied fetched data in an iSCSI protocol data unit. A header may be stripped from the iSCSI protocol data unit and the zero copied fetched data may be placed in the iSCSI buffer. The iSCSI buffer may be allocated for a next frame of the zero copied fetched data in the iSCSI protocol data unit. The zero copied fetched data may be placed into the pre-registered buffer. If frames of the zero copied fetched data are not in order, an out of order message may be generated. If frames of the zero copied fetched data are in order, a SCSI status signal may be communicated to the initiator. The zero copied fetched data may be verified.

Another embodiment of the invention may provide a machine-readable storage, having stored thereon, a computer program having at least one code section executable by a machine, thereby causing the machine to perform the steps as described above for handling data by a TCP offload engine.

In accordance with another embodiment of the invention, a system for supporting hardware acceleration for iSCSI read and write operations via a TCP offload engine may be provided. In this regard, the system may comprise a target, for example, an iSCSI target 122 (FIG. 1) that pre-registers at least one buffer with hardware. The target 122 may receive an iSCSI command from an initiator, for example, an iSCSI software initiator 222 (FIG. 2a). Hardware may be adapted to compare an initiator test tag value (ITT), a data sequence value and a buffer offset value of an iSCSI buffer, for example, B1 316 (FIG. 3) with the pre-registered buffer, for example, the fixed size buffer 336. Hardware may fetch data from the pre-registered buffer 336 based on the comparing of the initiator test tag value, the data sequence value and the buffer offset value of the iSCSI buffer, for example, B1 316 with the pre-registered buffer, for example, the fixed size buffer 336. The hardware may zero copy the fetched data from the pre-registered buffer, for example, the fixed size buffer 336 to the initiator, for example, the initiator 222.

In a further aspect of the system, the target 122 may communicate a request to transmit (R2T) signal to the initiator 222. The target may receive a transmitted data out signal. A retransmitted TCP sequence may be received by the target 122 from the initiator 222 in response to receiving a first frame of the zero copied fetched data in an iSCSI protocol data unit stored in an iSCSI PDU chain 327. The hardware may be adapted to strip a header from the iSCSI protocol data unit stored in an iSCSI PDU chain 327 and place the zero copied fetched data in the iSCSI buffer, for example, B1 316. The hardware may allocate the iSCSI buffer, for example, B1 316 for a next frame of the zero copied fetched data in the iSCSI protocol data unit stored in an iSCSI PDU chain 327. The hardware may place the zero copied fetched data into the pre-registered buffer, for example, B1 316. If frames of the zero copied fetched data are not in order, hardware may generate an out of order message. If frames of the zero copied fetched data are in order, the target 122 may communicate a SCSI status signal to the initiator 222. The initiator 222 may verify the zero copied fetched data. For example, in FIG. 3, a driver may send a status signal from the status indicator block 388 to the iSCSI completion chain status block 348, which indicates the completion of the write operation and frees the iSCSI request table CSB 366.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data, the method comprising:
   a TCP offload engine receiving, from a driver, a plurality of buffers for pre-registration;
   fetching, by the TCP offload engine, data from a selected one of a plurality of the pre-registered buffers based on comparing a data sequence value of an iSCSI buffer and a buffer offset value of said iSCSI buffer with said pre-registered buffers; and
   zero copying, by the TCP offload engine, said fetched data from said selected pre-registered buffer to an initiator.

2. The method according to claim 1, comprising receiving an iSCSI write command from said initiator.

3. The method according to claim 2, comprising communicating a request to transmit (R2T) signal to said initiator based on said received iSCSI write command.

4. The method according to claim 3, comprising receiving a data out signal from said initiator in response to said communicated R2T signal.

5. The method according to claim 1, wherein said fetching is further based on comparing an initiator test tag value associated with said initiator with said selected pre-registered buffer.

6. The method according to claim 1, comprising retransmitting a TCP sequence to said initiator based on said zero copied said fetched data.

7. The method according to claim 1, comprising communicating a SCSI status signal to said initiator, if frames of said zero copied said fetched data are in order.

8. The method according to claim 1, wherein said zero copied said fetched data is placed in said iSCSI buffer.

9. The method according to claim 1, wherein said zero copied said fetched data is verified by said initiator.

10. A system for handling data, the system comprising:
    one or more circuits that are operable to fetch data from a selected one of a plurality of pre-registered buffers based on comparing a data sequence value of an iSCSI buffer and a buffer offset value of said iSCSI buffer with said pre-registered buffers; and
    said one or more circuits are operable to zero copy said fetched data from said selected pre-registered buffer to an initiator.

11. The system according to claim 10, wherein said one or more circuits are operable to receive an iSCSI write command from said initiator.

12. The system according to claim 11, wherein said one or more circuits are operable to communicate a request to transmit (R2T) signal to said initiator based on said received iSCSI write command.

13. The system according to claim 12, wherein said one or more circuits are operable to receive a data out signal from said initiator in response to said communicated R2T signal.

14. The system according to claim 10, wherein said fetch is further based on comparing an initiator test tag value associated with said initiator with said selected pre-registered buffer.

15. The system according to claim 10, wherein said one or more circuits are operable to communicate a SCSI status signal to said initiator, if frames of said zero copied said fetched data are in order.

16. The system according to claim 10, wherein said one or more circuits are operable to generate an out of order message, if frames of said zero copied said fetched data are not in order.

17. The system according to claim 10, wherein said zero copied said fetched data is placed in said iSCSI buffer.

18. The system according to claim 10, wherein said zero copied said fetched data is verified by said initiator.

19. The system according to claim 10, wherein said one or more circuits are operable to receive, from a driver, a plurality of pre-registration requests, each associated with a buffer.

20. A system for handling data, the system comprising:
    processing circuitry operable to fetch data from a selected one of a plurality of pre-registered buffers based on comparing a data sequence value of an iSCSI buffer and a buffer offset value of said iSCSI buffer with said pre-registered buffers; and
    processing circuitry operable to zero copy said fetched data from said selected pre-registered buffer to an initiator.

21. The system according to claim 20, further comprising processing circuitry operable to receive, from a driver, a plurality of pre-registration requests, each associated with a buffer.

* * * * *